PROCESS FOR PREPARING MANGANESE CARBONYL HYDRIDE

Thomas H. Coffield, Farmington, Mich., assignor to Ethyl Corporation, New York, N.Y., a corporation of Virginia
No Drawing. Filed May 19, 1964, Ser. No. 368,682
13 Claims. (Cl. 23—14)

This application is a continuation-in-part of application Serial No. 717,531, filed February 25, 1958, which in turn is a continuation-in-part of application Serial No. 645,674, filed March 13, 1957, now U.S. 2,967,087.

This invention relates to, and has as its principal object, the preparation of manganese carbonyl hydride which is a valuable intermediate in the preparation of other compounds containing manganese bonded to carbonyl groups.

The present invention is a process which comprises reacting an alkali metal manganese pentacarbonyl compound with an acid to produce manganese pentacarbonyl hydride. This process is illustrated by the following chemical equation, in which M represents an alkali metal.

$$MMn(CO)_5 + H^+ \rightarrow HMn(CO)_5 + M^+$$

The alkali metal manganese carbonyl employed in the process of this invention is preferably sodium manganese pentacarbonyl, but other alkali metal manganese carbonyl compounds may also be employed.

The acid reactant in the preparation of this invention which is represented by $H^+$ in the above equation is, in general, an acid of greater strength than the resulting manganese pentacarbonyl hydride. The mineral acids and lower aliphatic acids of appropriate strength are preferred since they are the least expensive and most readily available for commercial operations.

The manganese carbonyl hydride which is a product of this invention is a nearly colorless liquid at room temperature and has a melting point of approximately $-20°$ C. The compound boils at about $50°$ C. It is useful as an antiknock agent when added to gasoline and is also a valuable intermediate in the preparation of other manganese carbonyl compounds. The average value for the dissociation constant of manganese pentacarbonyl hydride in water at $20°$ C. is $0.8 \times 10^{-7}$ as determined by Hieber and Wagner, Z. Naturforschg. 13b, pages 339–345 (1958).

The alkali metal manganese carbonyl reactant employed in the process of this invention is ordinarily contained in an ether solvent. The preferred solvents are ethers containing a plurality of carbon to oxygen linkages and cyclic ethers. An example of the former is the dimethylether of diethylene glycol. Examples of the latter type include dioxane and tetrahydrofuran. However, the lower aliphatic ethers can also be employed as solvents and carriers for the alkali metal manganese carbonyl reactant. Thus, ethylether, propylether and the like can be employed as solvents.

The manganese carbonyl hydride product of the process of this invention can be recovered by several methods from the reaction mixture or it may be used in further preparation without isolation. When the ether solvent containing the alkali metal manganese carbonyl reactant in the process of this invention, is miscible with water, the treatment with aqueous acid ordinarily causes separation of the manganese carbonyl hydride which is not soluble to any appreciable extent in water. In this case, the manganese carbonyl hydride can be separated from the reaction mixture by simple decantation followed by subsequent purification. Alternatively, the manganese carbonyl hydride can be extracted with a lower aliphatic ether, such as ethyl ether, which is not miscible with water. Thus, when the ether containing the alkali metal manganese carbonyl reactant is immiscible with water, the manganese carbonyl hydride product will be isolated from the organic phase of the reaction mixture. When the ether solution of alkali metal manganese carbonyl is treated with an anhydrous acid to prepare manganese carbonyl hydride, the alkali metal salt of the acid employed normally separates from the ether solution leaving manganese carbonyl hydride in ether solution which may be employed in further synthesis or blended with gasoline without further separation or purification. However, a preferred method of obtaining the manganese carbonyl hydride in its pure form is to sweep the reaction mixture with an inert gas such as nitrogen or argon and pass the resulting gases through a plurality of cold traps cooled to the temperature of Dry Ice. The manganese carbonyl hydride which is extremely volatile is thus swept out of the reaction mixture and collects as a solid in the cold traps.

The process of this invention is illustrated by the following examples in which all parts and percentages are by weight.

Example I

Sodium manganese pentacarbonyl was prepared from an excess of sodium amalgam (1.0 percent sodium) and 5 parts of manganese carbonyl in 44 parts of tetrahydrofuran as a solvent. An aliquot of the resulting solution which had been freed of excess amalgam was diluted with 50 parts of water while the solution was maintained in a nitrogen atmosphere. The clear yellow solution which resulted, was treated with about 90 parts of 0.1 N hydrochloric acid to give a stoichiometric conversion to manganese carbonyl hydride. A white emulsion was formed upon addition of the acid.

Manganese carbonyl hydride is isolated from this mixture by sweeping the reaction vessel with nitrogen, passing the resultant mixture of manganese carbonyl and nitrogen through a trap cooled to the temperature of Dry Ice wherein the manganese carbonyl hydride precipitates as a white solid. On warming to room temperature the manganese carbonyl hydride becomes an almost colorless pale yellow liquid. The infrared spectra of this compound confirms the assigned structure by its relationship to the carbonyl hydrides of copper and iron.

Example II

Manganese carbonyl hydride is prepared by the treatment of a solution of sodio manganese pentacarbonyl in tetrahydrofuran with water as in the above example and subsequent reaction with acid. In this example the manganese carbonyl hydride is not isolated but is used to prepare chloromanganese pentacarbonyl by the addition of 16.3 parts of carbon tetrachloride with agitation. Shortly after addition of the carbon tetrachloride, a solid precipitates which is identified as an 80 percent yield of chloromanganese pentacarbonyl.

Example III

The above example is repeated except that the manganese carbonyl hydride is reacted with bromoform to give an excellent yield of bromomanganese pentacarbonyl. The preparation of bromomanganese pentacarbonyl is also accomplished in high yield by reacting manganese carbonyl hydride with methylene bromide.

Example IV

Potassium manganese pentacarbonyl prepared by the reaction of metallic sodium with manganese carbonyl in the dibutylether of diethylene glycol as a solvent is treated with a stoichiometric quantity of 1.0 N sulfuric acid to produce an excellent yield of manganese pentacarbonyl hydride. The product is recovered in a cold trap by sweeping the reaction mixture with argon in the manner described in Example I.

Good results are also obtained when rubidium or cesium manganese pentacarbonyl is employed in lieu of the potassium manganese pentacarbonyl.

*Example V*

Sodio manganese pentacarbonyl contained in 1,4-dioxane is treated with stoichiometric quantity of glacial acetic acid to produce a high yield of manganese carbonyl hydride.

Good results are also obtained when dilute aqueous lower aliphatic acids such as formic acid, propionic acid, butenoic acid and the like are employed.

*Example VI*

Example I is repeated using phosphoric acid in lieu of hydrochloric acid with equally effective results.

*Example VII*

A tetrahydrofuran solution of sodiomanganese pentacarbonyl prepared as in Example I is treated with anhydrous hydrochloric acid by bubbling an excess of the HCl gas through the tetrahydrofuran solution. Sodium chloride precipitates from the solution which is allowed to settle. The precipitate is separated by filtration leaving an acidic solution of manganese carbonyl hydride in tetrahydrofuran which is immediately available for use in further synthesis. To free the solution of acid, excess water may be added whereupon the manganese carbonyl hydride separates from the water-tetrahydrofuran phase. The manganese carbonyl hydride may be recovered by sweeping into a cold trap, extraction with ethylether, or by simple decantation as described above.

As pointed out above, any acid stronger than manganese carbonyl hydride itself can be employed in the process of this invention, the mineral acids and lower aliphatic acids being preferred. When the acid employed contains a strong oxidizing group, it is, of course, best to employ a dilute aqueous solution of the acid so that the oxidizing group will not react with the manganese carbonyl. Examples of acids applicable to the process of this invention include hydrochloric acid, sulfuric acid, nitric acid, phosphoric acid, acetic acid, pentanoic acid, benzoic acid and numerous other acids well known to the art.

To insure a maximum yield of the manganese carbonyl hydride product of this invention, it is desirable to maintain the reaction under a blanket of an inert gas such as nitrogen, argon, xenon, and the like.

Elevated temperatures are not required in the process of this invention, superior results being obtained when the reaction is conducted at the prevailing room temperature.

The preparation of the alkali metal manganese pentacarbonyl compounds employed in the process of this invention is more fully described in application Serial No. 645,674, filed March 13, 1957.

The use of manganese pentacarbonyl hydride in the further synthesis of manganese carbonyl-containing compounds was illustrated in Examples II and III above. A further illustration is represented by the following examples.

*Example VIII*

A portion of manganese carbonyl hydride prepared by the process of Example I was dissolved in carbon tetrachloride at —20° C. to yield a nearly colorless solution. Upon warming the solution, pale yellow crystals precipitated. The crystals were analyzed by infrared spectroscopy and were shown to be chloromanganese pentacarbonyl.

*Example IX*

To illustrate the usefulness of the chloromanganese pentacarbonyl prepared from manganese carbonyl hydride which is made by the process of this invention, cyclopentadienyl manganese tricarbonyl, a valuable antiknock agent, is prepared from cyclopentadienyl sodium and chloromanganese pentacarbonyl. The procedure is as follows: Cyclopentadienyl sodium is prepared by reacting cyclopentadiene with sodium dispersed in tetrahydrofuran. The solution is then added slowly to a tetrahydrofuran solution containing chloromanganese pentacarbonyl with agitation. A finely divided solid is formed and carbon monoxide is slowly evolved. When the reaction is complete, the solvent is removed under reduced pressure and the residue sublimed at about 70° C. at a pressure of less than 1 millimeter of mercury. The product is found to contain a good yield of cyclopentadienyl manganese tricarbonyl which can be identified by comparison of the infrared spectra with that of an authentic sample of the compound.

*Example X*

A further example of the preparation of manganese carbonyl hydride within the scope of this invention is as follows. A reaction vessel equipped with gas inlet and outlet means, means for agitation and means for heating and cooling was flushed with nitrogen and charged with 3 parts of dimanganese decacarbonyl in 44 parts of tetrahydrofuran and 2 parts of a 50 percent sodium dispersion in white mineral oil. The mixture was stirred at 50° C. for 3 hours and then allowed to settle. The supernatant liquid was decanted and divided into aliquots. The dimanganese decacarbonyl solution in tetrahydrofuran had a yellow color prior to treatment with the sodium dispersion; however, after the reaction period, the supernatant solution was colored amber.

Manganese carbonyl hydride is prepared from the supernatant solution as follows. A 20 milliliter aliquot of the amber solution was treated with 50 milliliters of water and the resulting mixture was titrated with 0.1 normal hydrochloric acid, the end point being determined with pH paper. Neutralization was effected at 43 milliliters whereas the calculated amount of acid was 56 milliliters. This shows a 77 percent conversion to sodium manganese pentacarbonyl.

I claim:

1. The process of preparing manganese pentacarbonyl hydride having the formula $HMn(CO)_5$ which process comprises reacting an alkali metal manganese pentacarbonyl with an acid having a larger dissociation constant than manganese pentacarbonyl hydride.

2. The process of claim 1 wherein the acid is selected from the group consisting of mineral acids and lower aliphatic acids.

3. The process of claim 2 wherein the reaction is carried out under a blanket of an inert gas.

4. The process for preparing manganese pentacarbonyl hydride having the formula $HMn(CO)_5$ which process comprises reacting an alkali metal manganese pentacarbonyl in an ether solvent with an aqueous acid having a larger dissociation constant than manganese pentacarbonyl hydride.

5. The process of claim 4 wherein the acid is selected from the group consisting of mineral acids and lower aliphatic acids.

6. The process of claim 4 wherein the reaction is carried out under a blanket of an inert gas.

7. The process of claim 4 wherein the ether solvent is selected from the group consisting of open chain ethers containing a plurality of carbon-to-oxygen linkages and cyclic ethers.

8. A process for preparing manganese pentacarbonyl hydride having the formula $HMn(CO)_5$ which process comprises reacting sodium manganese pentacarbonyl in tetrahydrofuran as a solvent with aqueous hydrochloric acid.

9. The process for preparing manganese pentacarbonyl hydride having the formula $HMn(CO)_5$ which process comprises (1) reacting manganese decacarbonyl with an alkali metal reactant in an ether solvent and (2) treating the alkali metal manganese pentacarbonyl ether solution produced in step (1) with an acid having a larger dissociation constant than manganese pentacarbonyl hydride.

10. A process for the determination of the extent of conversion of dimanganese decacarbonyl to an alkali metal manganese pentacarbonyl, said process comprising titrating in the presence of water an alkali metal manganese pentacarbonyl solution, produced by reaction of dimanganese decacarbonyl with an alkali metal, with an acid having an acid dissociation constant greater than the acid dissociation constant of manganene pentacarbonyl hydride.

11. A process for the determination of the extent of conversion of dimanganese decacarbonyl to an alkali metal manganese pentacarbonyl, said process comprising titrating, in the presence of water, an alkali metal manganese pentacarbonyl solution, produced by reaction of dimanganese decacarbonyl with an alkali metal, with hydrochloric acid.

12. The process for hydrolyzing an alkali metal manganene pentacarbonyl, said process comprising reacting said pentacarbonyl with an aqueous solution of an acid having a greater dissociation constant than manganese pentacarbonyl hydride.

13. The process of claim 12 wherein said acid is hydrochloric acid.

References Cited by the Examiner

UNITED STATES PATENTS

| 2,088,997 | 8/1937 | Max | 23—203 X |
| 2,967,087 | 1/1961 | Coffield | 23—14 |

OTHER REFERENCES

Clossen et al.: "Journal of Organic Chemistry," vol. 22, p. 598 (May 1, 1957).

Charlot et al.: "Quantitative Inorganic Analysis," 1957, p. 13.

Hieber et al.: "Zeitschrift für Naturforschung," vol. 12B, pp. 478–479 (July 1, 1957).

Hurd et al.: "Journal of the American Chemical Society," vol. 71, p. 1899 (1949).

BENJAMIN HENKIN, *Primary Examiner.*

MAURICE A. BRINDISI, *Examiner.*